US006970209B2

(12) United States Patent
Jun

(10) Patent No.: US 6,970,209 B2
(45) Date of Patent: Nov. 29, 2005

(54) THIN FILM TRANSISTOR ARRAY SUBSTRATE FOR A LIQUID CRYSTAL DISPLAY AND METHOD FOR FABRICATING THE SAME

(75) Inventor: Sahng-ik Jun, Yongin (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/852,647

(22) Filed: May 11, 2001

(65) Prior Publication Data

US 2001/0040663 A1 Nov. 15, 2001

(30) Foreign Application Priority Data

May 12, 2000 (KR) ............................... 2000-25466

(51) Int. Cl.[7] ............................................ G02F 1/1343

(52) U.S. Cl. ........................ 349/44; 349/110; 349/140; 349/141; 257/59; 257/72; 438/30; 438/149; 438/161

(58) Field of Search .......................... 349/141, 110, 38, 349/43, 140, 143, 42, 44, 98, 111, 147; 345/98; 257/59, 72, 294, 350; 438/29, 30, 149, 161

(56) References Cited

U.S. PATENT DOCUMENTS 4,888,632 A * 12/1989 Haller ....................... 357/23.7
5,247,289 A * 9/1993 Matsueda .................... 345/98
5,892,562 A * 4/1999 Yamazaki et al. .......... 349/141
6,377,323 B1 * 4/2002 Ono et al. .................... 349/43
6,411,357 B1 * 6/2002 Ting et al. .................. 349/141
6,466,286 B1 * 10/2002 Lee et al. ................... 349/141
6,485,997 B2 * 11/2002 Lee et al. ...................... 438/30
6,746,905 B1 * 6/2004 Fukuda ....................... 438/164

* cited by examiner

*Primary Examiner*—Dung T. Nguyen
*Assistant Examiner*—Thoi V. Duong
(74) *Attorney, Agent, or Firm*—McGuireWoods LLP

(57) ABSTRACT

A thin film transistor array substrate includes a gate line assembly and a common line assembly formed on an insulating substrate. The gate line assembly has gate lines proceeding in the horizontal direction, and gate electrodes connected to the gate lines. The common line assembly has a plurality of common electrodes placed within pixel regions, and common signal lines interconnecting the common electrodes. A gate insulating layer covers the gate line assembly and the common line assembly, and semiconductor patterns and light interception patterns are formed on the gate insulating layer with the same material. A data line assembly and a pixel line assembly are formed on the gate insulating layer. The data line assembly has data lines crossing over the gate lines to define the pixel regions, and source/drain electrodes. The pixel line assembly has pixel electrodes proceeding in parallel to the common electrodes while being spaced apart from the common electrodes with a predetermined distance. In order to prevent leakage of light at the periphery of the data lines, each light interception pattern is overlapped with the corresponding data line, and the common or the pixel electrodes positioned close to the data line.

38 Claims, 24 Drawing Sheets

THIN FILM TRANSISTOR ARRAY SUBSTRATE FOR A LIQUID CRYSTAL DISPLAY AND METHOD FOR FABRICATING THE SAME

BACKGROUND OF THE INVENTION (a) Field of the Invention

The present invention relates to a thin film transistor array substrate for a liquid crystal display and, more particularly, to a thin film transistor array substrate for in-plane switching type liquid crystal displays.

(b) Description of the Related Art

Recently, a twisted nematic (TN) mode has been applied to liquid crystal displays in a most extensive manner. In the TN mode, electrodes are provided at the two substrates while interposing the liquid crystal, and the longitudinal molecular axes (the so-called directors) of the liquid crystal are twisted by 90° with respect to the substrates. When voltages are applied to the electrodes, the directors of the liquid crystal are driven. Such a TN mode bears a narrow viewing angle, however. In this connection, in-plane switching (IPS) typed liquid crystal displays have been developed to replace for the TN mode liquid crystal displays. U.S. Pat. No. 5,598,285 discloses such an in-plane switching typed liquid crystal display.

However, in such an in-plane switching typed liquid crystal display, potential difference is made between the data line and the neighboring pixel or common electrodes so that light leaks at the periphery of the data line. The light leakage is directly seen from the lateral side, causing a lateral cross talk.

SUMMARY OF THE INVENTION

It is an object of the present invention to provide an in-plane switching type liquid crystal display with minimum leakage of light.

These and other objects may be achieved with the following structure. In a thin film transistor array substrate for the in-plane switching type liquid crystal display, light interception patterns are formed at the same plane as the semiconductor patterns such that they are overlapped with data lines as well as pixel or common electrodes positioned close to the data lines.

According to one aspect of the present invention, the thin film transistor array substrate includes a plurality of gate lines formed at a transparent insulating substrate, and a plurality of data lines crossing over the gate lines in a matrix form to define pixel regions while being insulated from the gate lines. Common electrodes and pixel electrodes are placed at the pixel regions while being spaced apart from each other with a predetermined distance. Thin film transistors are electrically connected to the gate and the data lines. Each thin film transistor has a silicon-based semiconductor pattern. A light interception pattern is formed at the same plane as the semiconductor pattern with the same material.

The light interception pattern overlaps with the corresponding data line, and the common or the pixel electrodes positioned close to the data line. It is preferable that the light interception pattern is overlaps with the common or the pixel electrodes placed at the neighboring pixel regions.

The semiconductor pattern is connected to the corresponding light interception pattern, and extended to the bottom of the corresponding data line. The light interception pattern may be extended external to the periphery of the corresponding data line.

The pixel or common electrodes are formed at the same plane as the gate or data lines, or at the plane different from the gate or data lines.

According to another aspect of the present invention, the thin film transistor array substrate includes an insulating substrate, and a gate line assembly formed on the substrate. The gate line assembly has gate lines, and gate electrodes connected to the gate lines. Linear common electrodes are formed on the substrate while being separated from the gate line assembly. A gate insulating layer covers the gate line assembly and the common electrodes. Semiconductor patterns are formed on the gate insulating layer over the gate electrodes. Light interception patterns are formed on the gate insulating layer. The light interception pattern is formed with the same material as the semiconductor pattern. A data line assembly is formed on the substrate. The data line assembly has source and drain electrodes formed on the semiconductor patterns, and data lines connected to the source electrodes. The data lines crosses over the gate lines in a matrix form to define pixel regions. Linear pixel electrodes are formed at the pixel regions such that they are alternated with the common electrodes. The pixel electrodes are electrically connected to the drain electrodes.

A protective layer may cover the data line assembly while bearing contact holes. The pixel electrodes are formed on the protective layer such that they are connected to the drain electrodes through the contact holes.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or the similar components, wherein.

DETAILED DESCRIPTION OF THE PREFERRED EMBODIMENTS

Preferred embodiments of this invention will be explained with reference to the accompanying drawings.

Figure 1:
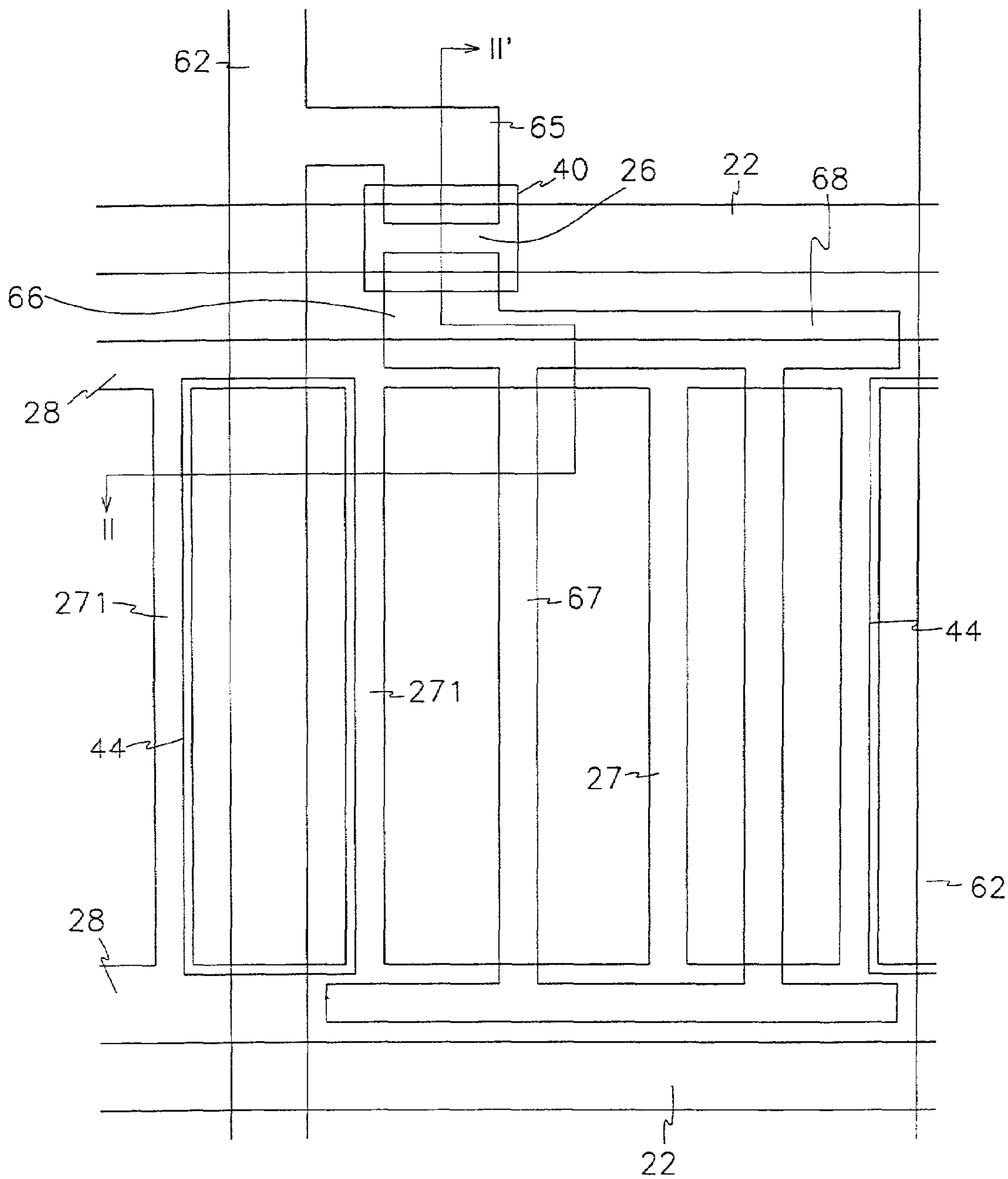
FIG. 1 is a plan view of a thin film transistor array substrate for an in-plane switching type liquid crystal display according to a first preferred embodiment of the present invention.
Figure 2:
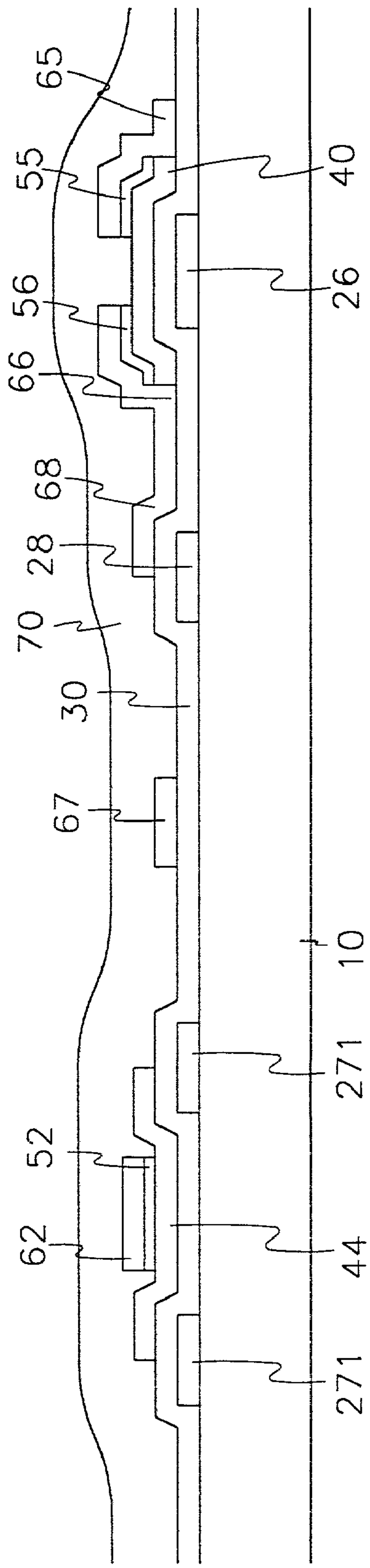
FIG. 2 is a cross sectional view of the thin film transistor array substrate taken along the 11–11' line of FIG. 1.

FIG. 1 is a plan view of a thin film transistor array substrate for an in-plane switching type liquid crystal display according to a first preferred embodiment of the present invention, and FIG. 2 is a cross sectional view of the liquid crystal display taken along the 11–11' line of FIG. 1.

As shown in the drawings, a gate line assembly and a common line assembly are formed on an insulating substrate 10. The gate line assembly and the common line assembly are single or multiple-layered with a metallic or conductive material such as Al or Al alloy, Mo or MoW alloy, Cr, and Ta. The gate line assembly includes gate lines 22 proceeding in the horizontal direction, and gate electrodes 26 connected to the gate lines 22 to form thin film transistors (TFTs). The gate line assembly may further include gate pads (not shown) for receiving scanning signals from the outside and transmitting the signals to the gate lines 22. The common line assembly includes common signal lines 28 proceeding parallel to the gate lines 22, and common electrodes 27 and 271 connected to the common signal lines 28 to receive common signals via the common signal lines 28. The common line assembly 27 and 28 may be overlapped with a pixel line assembly 67 and 68 to be described later to function as an electrode for a storage capacitor.

A gate insulating layer 30 is formed on the entire surface of the substrate 10 with silicon nitride while covering the gate line assembly 22 and 26, and the common line assembly 27 and 28.

Island-like semiconductor patterns 40 are formed on the gate insulating layer 30 over the gate electrodes 26 with amorphous silicon. Light interception patterns 44 are formed on the gate insulating layer 30 with the same material as the semiconductor patterns 40 such that the edge portions thereof are overlapped with the two neighboring common electrodes 271 and the two neighboring common signal lines 28 placed at the peripheral portions of the pixels. In this case, as the common electrodes 271 are positioned close to data lines 62 to be described later, the light interception patterns 44 are overlapped with the common electrodes 271. In contrast, when pixel electrodes 67 are positioned close to the data lines 62, the light interception patterns 44 may be overlapped with the pixel electrodes 67.

First and second ohmic contact patterns 55 and 56 are formed on the semiconductor patterns 40 with n+ hydrogenated amorphous silicon doped with n-type impurities at high concentration such that they are separated centering around the gate electrodes 26. Third ohmic contact patterns 52 are formed on the light interception patterns 44 such that they are connected to the first ohmic contact patterns 55.

A data line assembly and a pixel line assembly are formed on the ohmic contact patterns 52, 55 and 56, and the gate insulating layer 30. The data line assembly and the pixel line assembly are single or multiple-layered with a metallic material such as Cr, Mo—W alloy, Al and Al alloy, or indium tin oxide (ITO). The data line assembly includes data lines 62 crossing over the gate lines 22 in a matrix form while overlapping the light interception patterns 44, source electrodes 65 connected to the data lines 62 while extending toward the gate electrodes 24, and drain electrodes 66 separated from the data lines 62 while facing the source electrodes 65 centering around the gate electrodes 26. The data line assembly may further include data pads (not shown) connected to one end of the data lines 62 to receive picture signals from the outside. The pixel line assembly includes pixel signal lines 68 proceeding in the horizontal direction while being connected to the drain electrodes 66, and pixel electrodes 67 proceeding parallel to the common electrodes 27 and 271 while being connected to the pixel signal lines 68. The pixel signal lines 68 are overlapped with the common signal lines 28 to form storage capacitors.

A protective layer 70 is formed on the substrate 10. The protective layer 70 may have contact holes exposing the gate and data pads. A subsidiary data line assembly may be formed on the protective layer 70 such that it is connected to the data line assembly, and subsidiary pads may be also formed on the protective layer 70 such that they are electrically connected to the pads.

In this structure, the light interception patterns 44 may prevent light leakage between the data line 62 and the common electrodes 271 close thereto, thereby preventing a lateral cross talk. Particularly, it is important that the light interception patterns 44 are formed with the same material as the semiconductor patterns 40. If the light interception patterns 44 are formed with a metallic material bearing higher reflexibility, light is repeatedly reflected in-between the metallic light interception pattern and the data line 62 or the common electrodes 271. The resulting light leakage induces lateral cross talk.

The way of forming the light interception patterns 44 and the semiconductor patterns 40 at the same plane may be also applied to twisted nematic liquid crystal displays.

A method for fabricating the thin film transistor array substrate shown in FIG. 1 will be now described in detail.

FIGS. 3A to 5B illustrate the steps of fabricating the thin film transistor array substrate in a sequential manner.

Figure 3A:
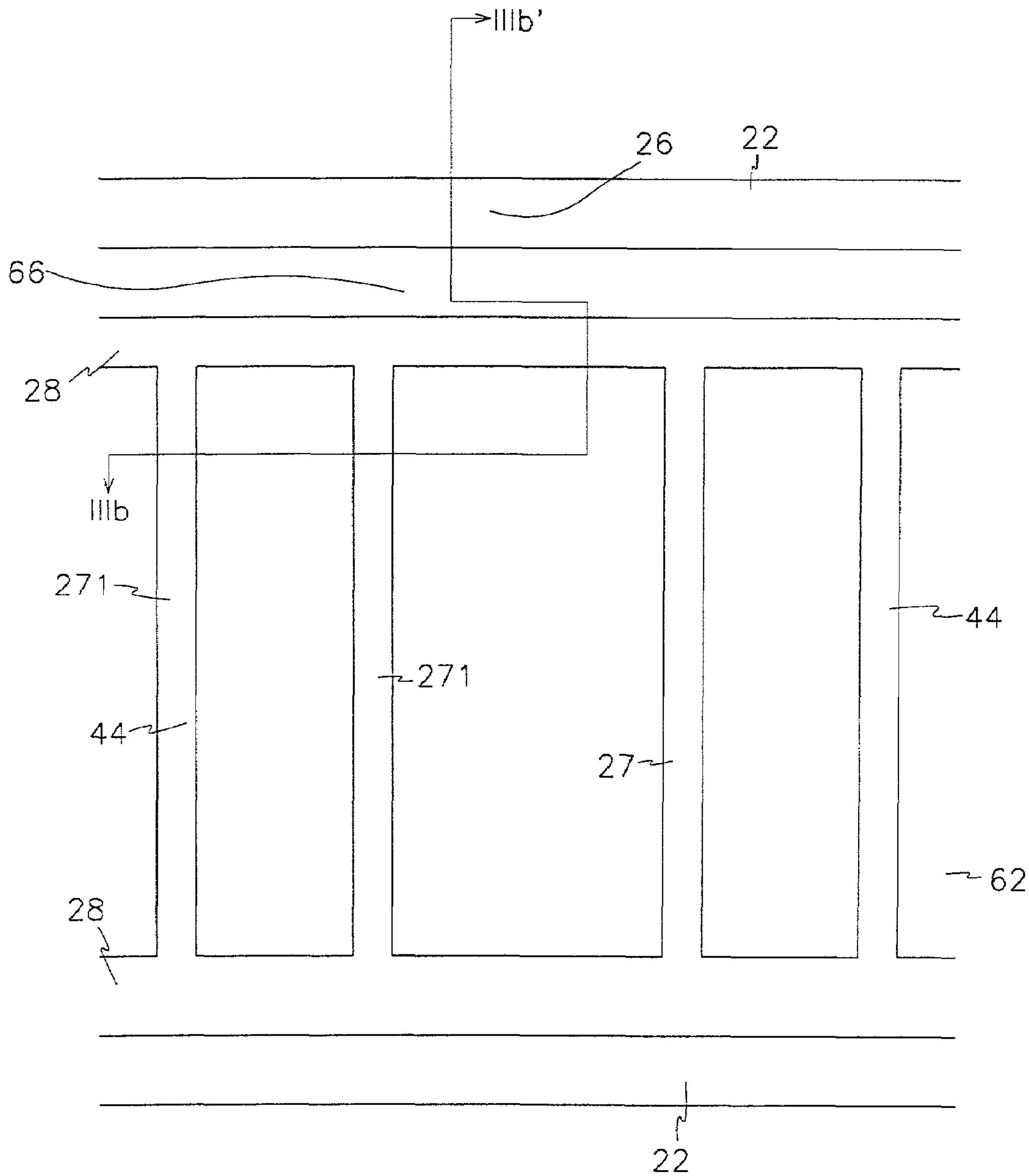
FIGS. 3A, 4A and 5A are plan views illustrating the steps of fabricating the thin film transistor array substrate shown in FIG. 1 in a sequential manner.
Figure 3B:
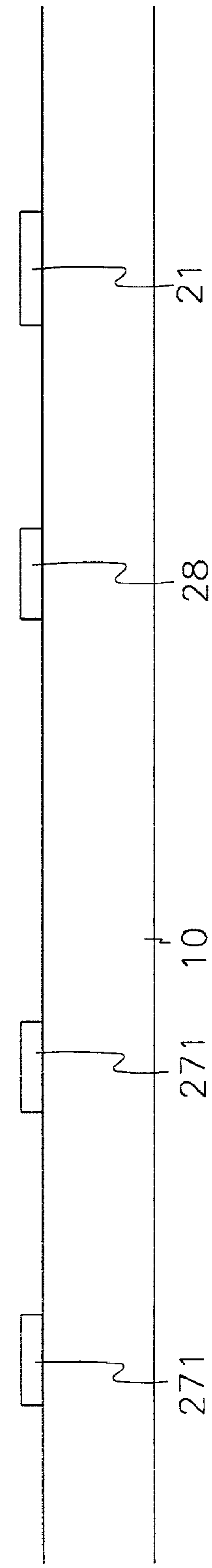
FIGS. 3B, 4B and 5B are cross sectional views of the thin film transistor array substrate taken along the IIIb–IIIb' line of FIG. 3A, the IVb–IVb' line of FIG. 4A, and the Vb–Vb' line of FIG. 5A, respectively.

As shown in FIGS. 3A and 3B, a metallic layer having a thickness of about 3000 Å is deposited onto a transparent insulating substrate 10, and patterned through photolithography using one mask to thereby form a gate line assembly and a common line assembly. The gate line assembly includes gate lines 22 and gate electrodes 26, and the common line assembly includes common signal lines 28 and common electrodes 27 and 271.

Figure 4A:
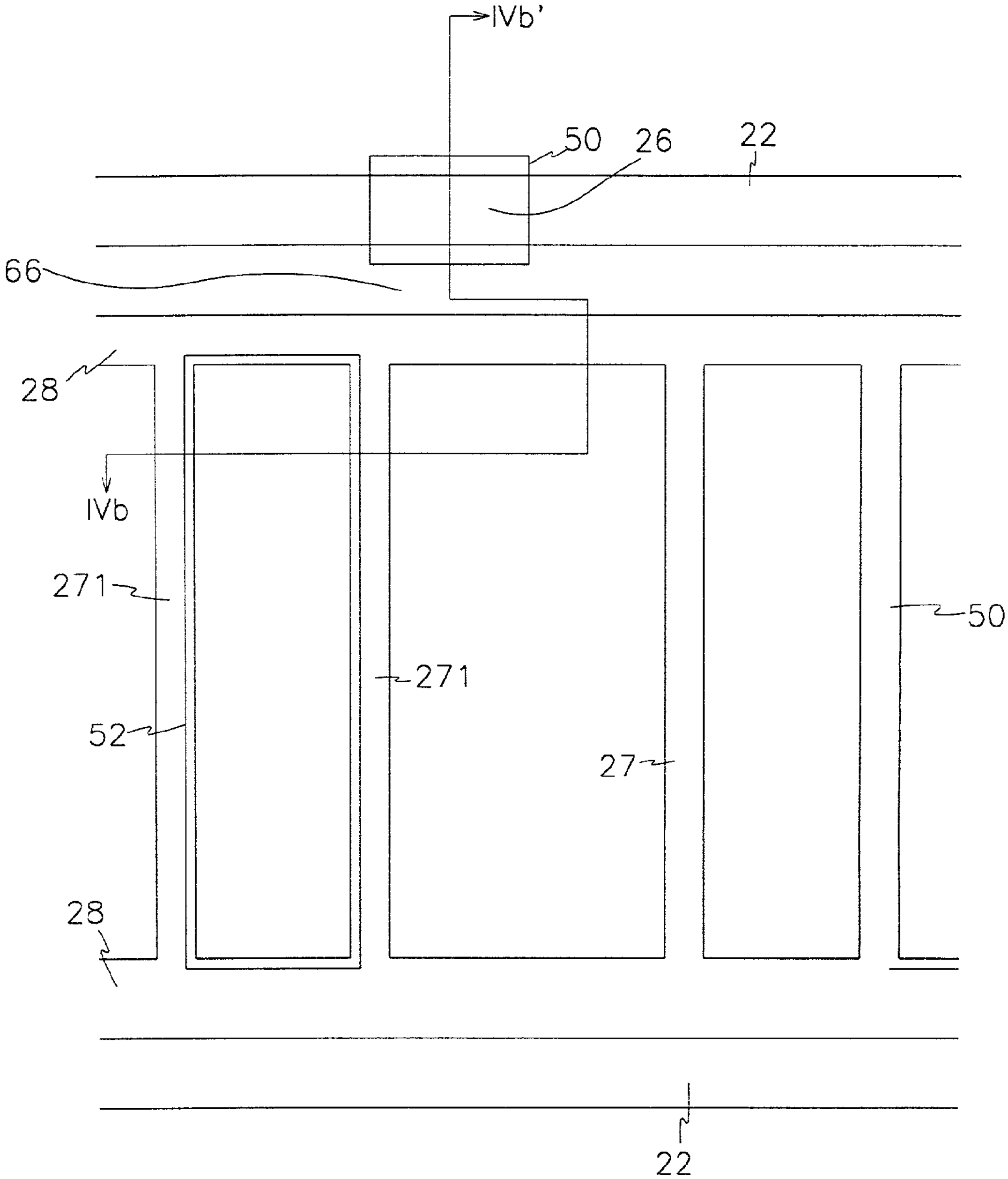
Figure 4B:
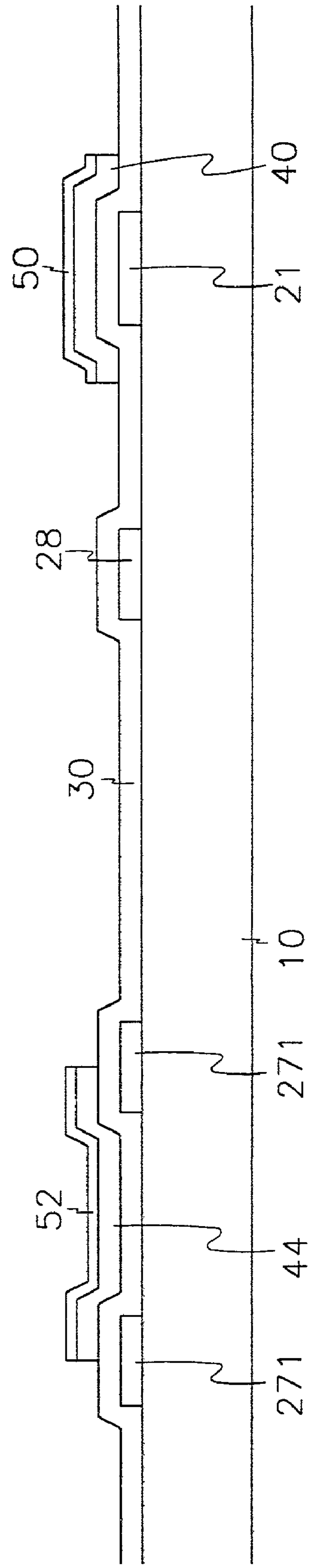

Thereafter, as shown in FIGS. 4A and 4B, a gate insulating layer 30 is deposited onto the substrate 10 with silicon nitride or organic insulating material to a thickness of 3000–5000 Å. An amorphous silicon layer 40 with a thickness of about 500–2000 Å, and a doped amorphous silicon layer 50 containing impurities such as phosphorous with a thickness of about 500 Å are deposited onto the gate insulating layer 30 in a sequential manner. The doped amorphous silicon layer 50 and the underlying amorphous silicon layer 40 are patterned together through photolithography using one mask to thereby form island-shaped semiconductor patterns 40 and light interception patterns 44, and ohmic contact patterns 50 and 52 thereon. The semiconductor patterns 40 are placed over the gate electrodes 26, and the light interception patterns 44 are respectively placed between the two neighboring common electrodes 271 centering around a data line 62 that will be formed later. At this time, the amorphous silicon layer 40 may be additionally left on the gate insulating layer 30 where the data lines 62 cross over the common electrode lines 28, and the gate lines 22.

Figure 5A:
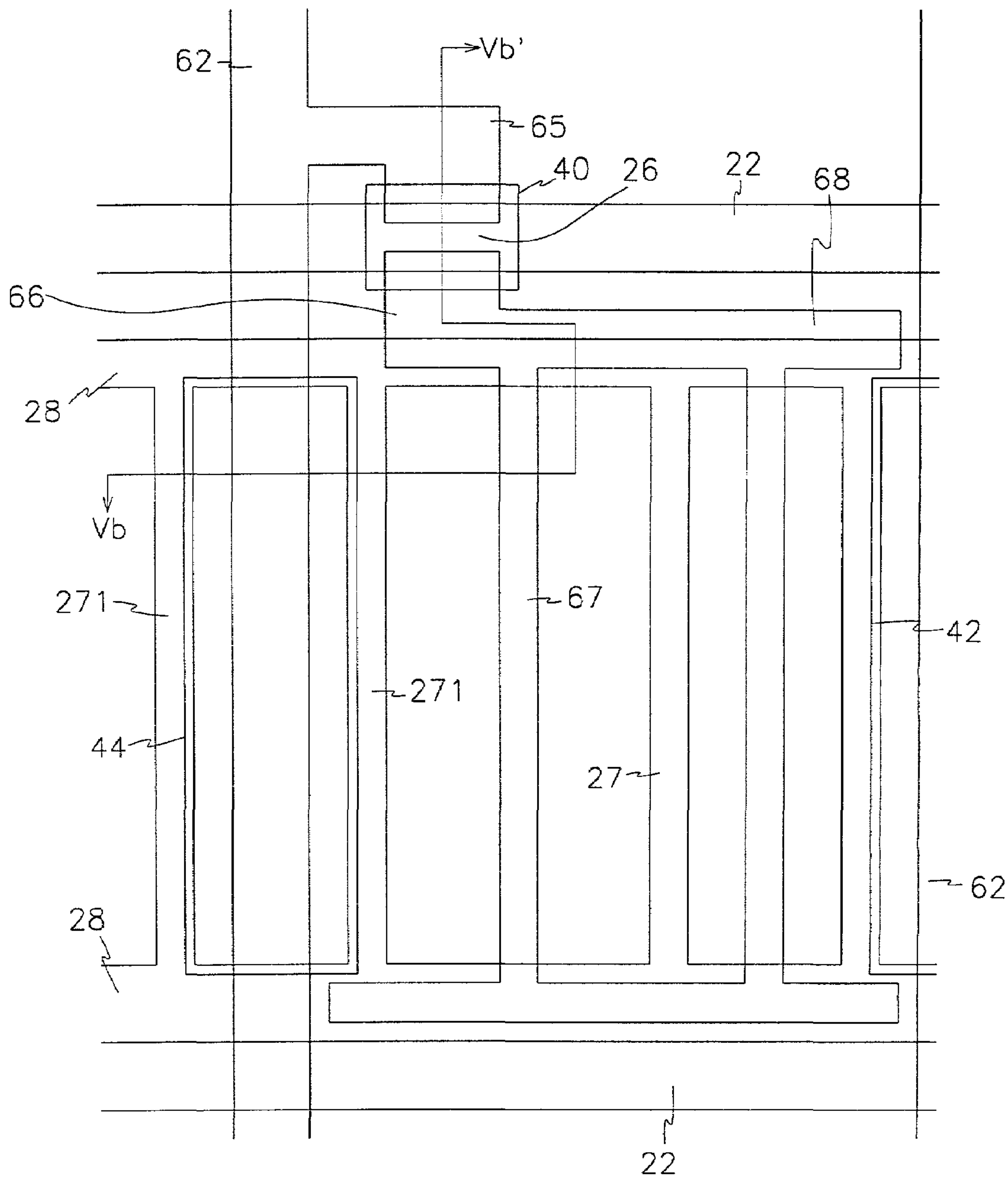
Figure 5B:
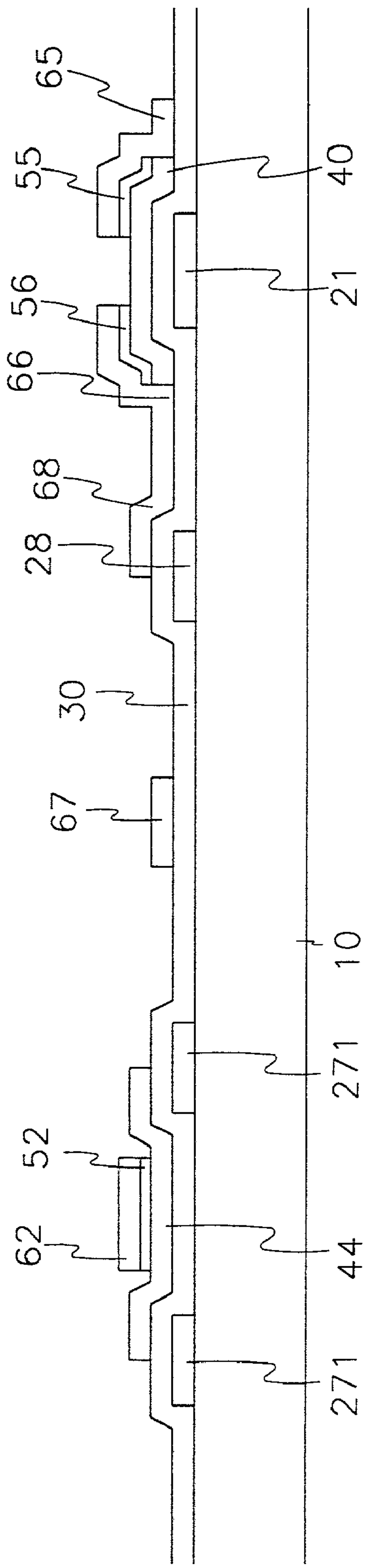

As shown in FIGS. 5A and 5B, a metallic layer with a thickness of 2000–5000 Å is deposited onto the substrate 10 with Cr, Al alloy, Mo, or Mo alloy, and patterned through photolithography using one mask to thereby form a data line assembly and a pixel line assembly. The data line assembly includes data lines 62 crossing over the gate lines 22, and source and drain electrodes 65 and 66. The pixel line assembly includes pixel signal lines 68, and pixel electrodes 67. Then, the ohmic contact patterns 50 exposed through the data line assembly are etched such that they are separated centering around the gate electrodes 26. In this way, the ohmic contact patterns 55 and 56 are completed. At this time, the portions of the ohmic contact patterns 52 on the light interception patterns 44 that are not covered by the data lines 62 are also etched.

Thereafter, as shown in FIGS. 1 and 2, a protective layer 70 is formed on the entire surface of the substrate 10 by depositing silicon nitride or organic insulating material thereon.

Thereafter, the steps of forming contact holes exposing the gate line assembly or the data line assembly through patterning the protective layer 70, and forming a subsidiary data line assembly and subsidiary pads through depositing a conductive layer onto the protective layer 70 and patterning it may be additionally performed.

Meanwhile, even if the semiconductor patterns and the data line assembly are formed through photolithography using one mask to simplify the overall processing steps, the light interception patterns may be formed at the same plane as the semiconductor patterns.

Figure 6:
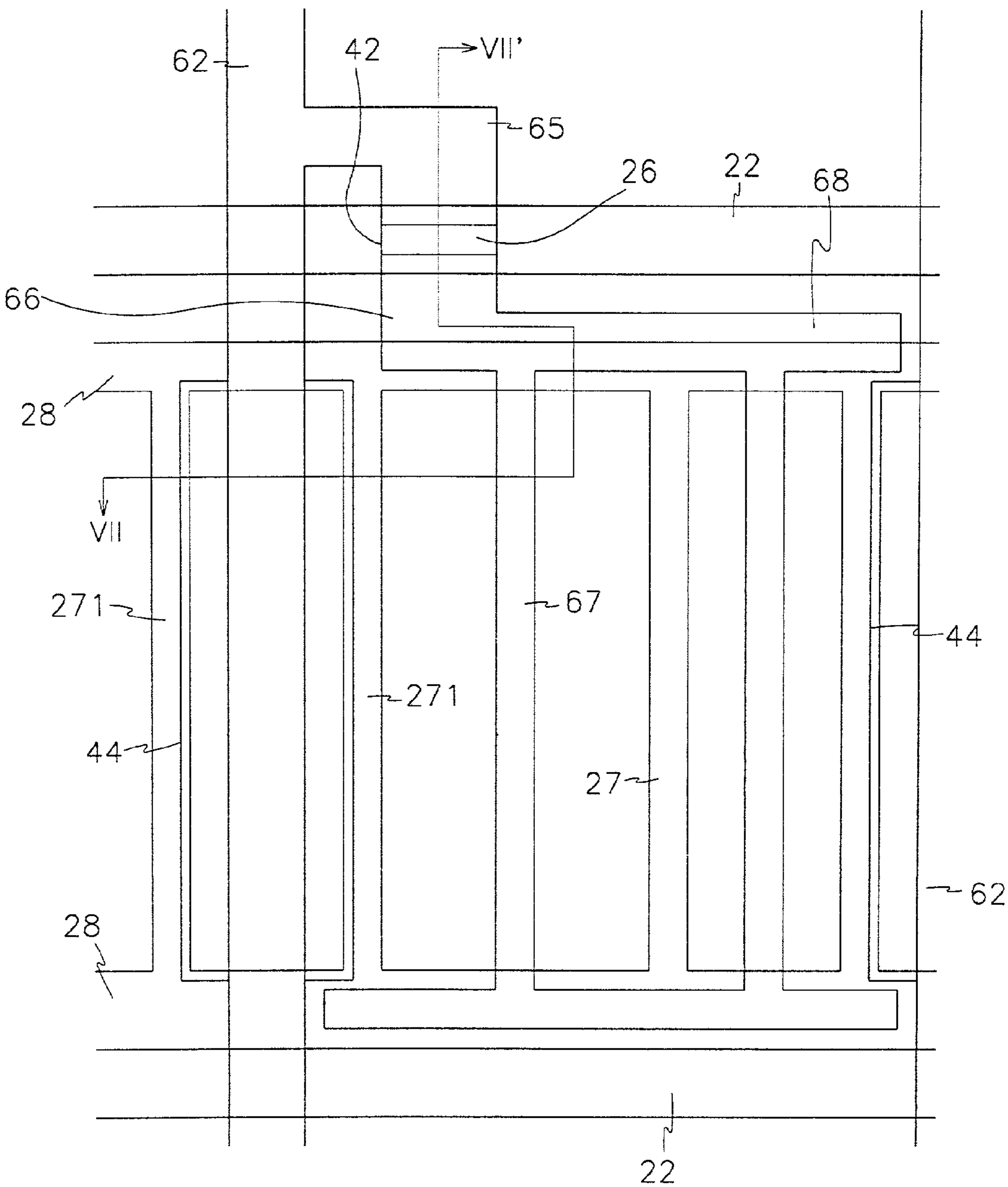
FIG. 6 is a plan view of a thin film transistor array substrate for an in-plane switching type liquid crystal display according to a second preferred embodiment of the present invention.
Figure 7:
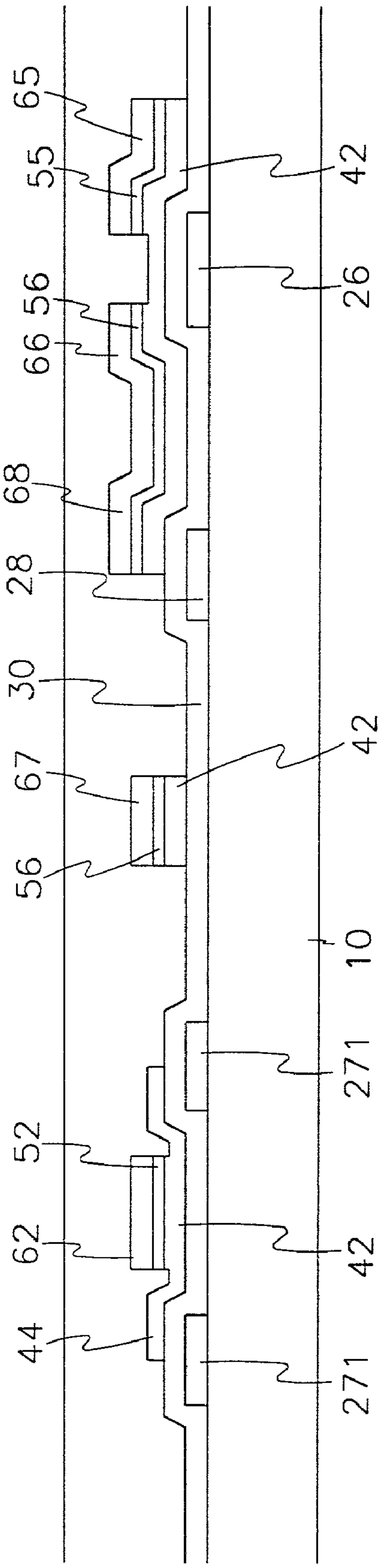
FIG. 7 is a cross sectional view of the thin film transistor array substrate taken along the VII–VII' line of FIG. 6.

FIG. 6 is a plan view of a thin film transistor array substrate for an in-plane switching type liquid crystal display according to a second preferred embodiment of the present invention, and FIG. 7 is a cross sectional view of the thin film transistor array substrate taken along the VII–VII' line of FIG. 6.

As shown in the drawings, a gate line assembly 22 and 26, a common line assembly 27, 271 and 28, a data line assembly 62, 65 and 66, and a pixel line assembly 67 and 68 have the same structure as those related to the first preferred embodiment.

The difference is made in that semiconductor patterns 42 have the same shape as the data line assembly 62, 65 and 66 except channel portions for TFTs. Furthermore, light interception patterns 44 are connected to the semiconductor patterns 42 below the data lines 62, and ohmic contact patterns 55 and 56 are formed with the same shape as the data line assembly 62, 65 and 66.

A method for fabricating the thin film transistor array substrate shown in FIG. 6 will now be described with reference to FIGS. 8 to 12.

First, as shown in FIGS. 3A and 3B, a gate line assembly 22 and 26, and a common line assembly 27, 271 and 28 are formed in the same way as in the first preferred embodiment.

Figure 8:
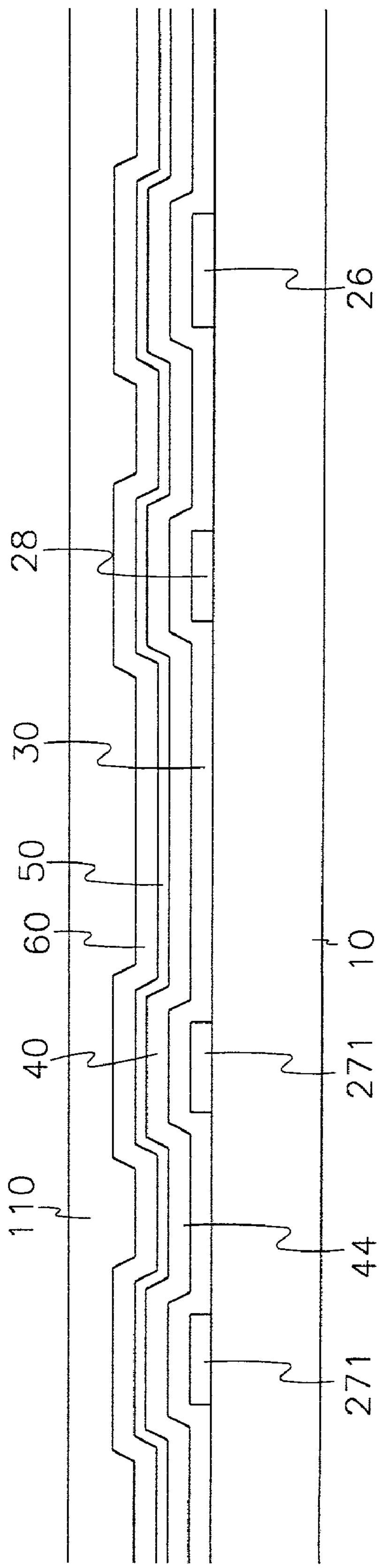
FIGS. 8 to 12 sequentially illustrate the steps of fabricating the thin film transistor array substrate shown in FIG. 6 after the processing step illustrated in FIGS. 3A and 3B.

Then, as shown in FIG. 8, a gate insulating layer 30 with a thickness of 1500–5000 Å, a semiconductor layer 40 with a thickness of 500–2000 Å, and an ohmic contact layer 50 with a thickness of 300–600 Å are sequentially deposited onto the substrate 10 through chemical vapor deposition. Thereafter, a conductive layer 60 with a thickness of 1500–3000 Å is deposited onto the ohmic contact layer 50 through sputtering. And a photoresist film 110 is coated onto the conductive layer 60 to a thickness of 1–2.

Figure 9:
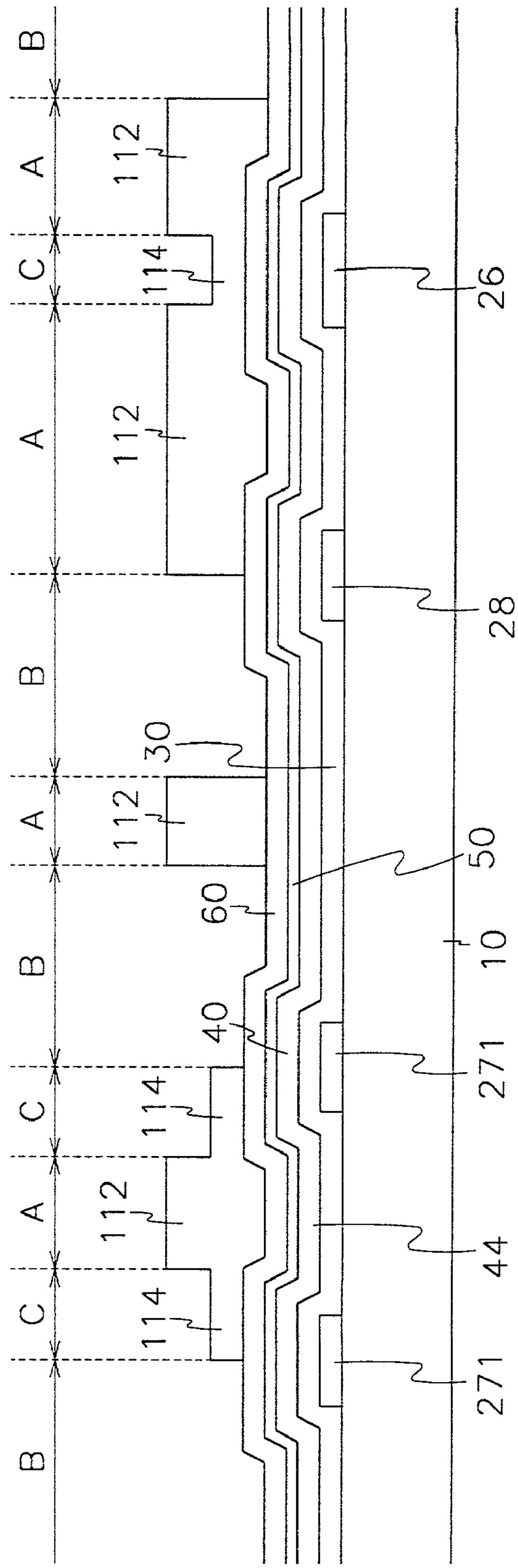

Thereafter, as shown in FIG. 9, the photoresist film 110 is exposed to light through a second mask, and developed to thereby form first and second photoresist patterns 112 and 114. At this time, the first photoresist pattern 114 placed at the channel portion C between source and drain electrodes 65 and 66 as well as the portion C where light interception patterns 44 are formed has a thickness smaller than that of the second photoresist pattern 112 placed at the portion A where the data line assembly 62, 65 and 66 and the pixel line assembly 67 and 68 are formed. The thickness ratio between the first photoresist pattern 114 at the C portion and the second photoresist pattern 112 at the A portion varies depending upon subsequent processing conditions. It is preferable that the thickness of the first photoresist pattern 114 is a half or less the thickness of the second photoresist pattern 112. Furthermore, it is preferable that the second photoresist pattern 112 has a thickness of 1.6–1.9, and the first photoresist pattern 114 has a thickness of 2000–5000 Å, or more preferably of 3000–4000 Å. In case a positive photoresist film is used to form such photoresist patterns 112 and 114, it is preferable that the mask for photolithography has a light transmission of 3% at portion A, a light transmission of 20–60%, or more preferably of 30–40% at portion C, and a light transmission of 90% or more at the remaining portion B.

Although various techniques may be applied in positionally differentiating the thickness of the photoresist film, two techniques will be introduced here when a positive photoresist film is used. For the processing convenience, the thickness of the photoresist film is preferably set to be in the range of 1.6–2, which is thicker than usual.

In the first technique, slit or lattice patterns, or semi-transparent films are provided at the mask to control the degree of light exposure. The patterning width or pitch is set to be smaller than the decomposition capacity of the light exposing device. Meanwhile, when a semi-transparent film is used in the mask, the film thickness may be varied to control the light transmission. Alternatively, a plurality of films of different thickness may be used to control the light transmission. Cr, MgO, MoSi, a-Si, etc. may be used to control the degree of light exposure.

When the photoresist film is exposed to light through the mask with slit patterns or a semi-transparent film, the degrees of molecular decomposition in the photoresist film became different between the patterned portion and the non-patterned portion. However, it should be noted that too long exposure may completely remove the photoresist film. When the photoresist film exposed to light is developed, the non-exposed portion almost keeps the initial thickness. The portion slightly exposed to light through the slit pattern or the semi-transparent film bears a middle thickness. And the portion completely exposed to light has nearly no thickness. In this way, the photoresist patterns 112 and 114 of partially different thickness may be made.

The second technique is based on reflow of the photoresist film. In this technique, a usual mask with a transparent portion and an opaque portion is used to form a usual photoresist pattern. In the photoresist pattern, the film portion is partially flown into the non-film portion while forming a second film portion with a middle thickness.

In these ways, the photoresist patterns 112 and 114 of positionally different thickness are made.

Then, the photoresist patterns 112 and 114, and the underlying conductive layer 60, ohmic contact layer 50, and semiconductor layer 40 are sequentially etched. At this time, the data line assembly and the underlying layers are left at the A portion, only the semiconductor layer is left at the C portion, and the gate insulating layer 30 is exposed to the outside at the remaining B portion.

Figure 10:
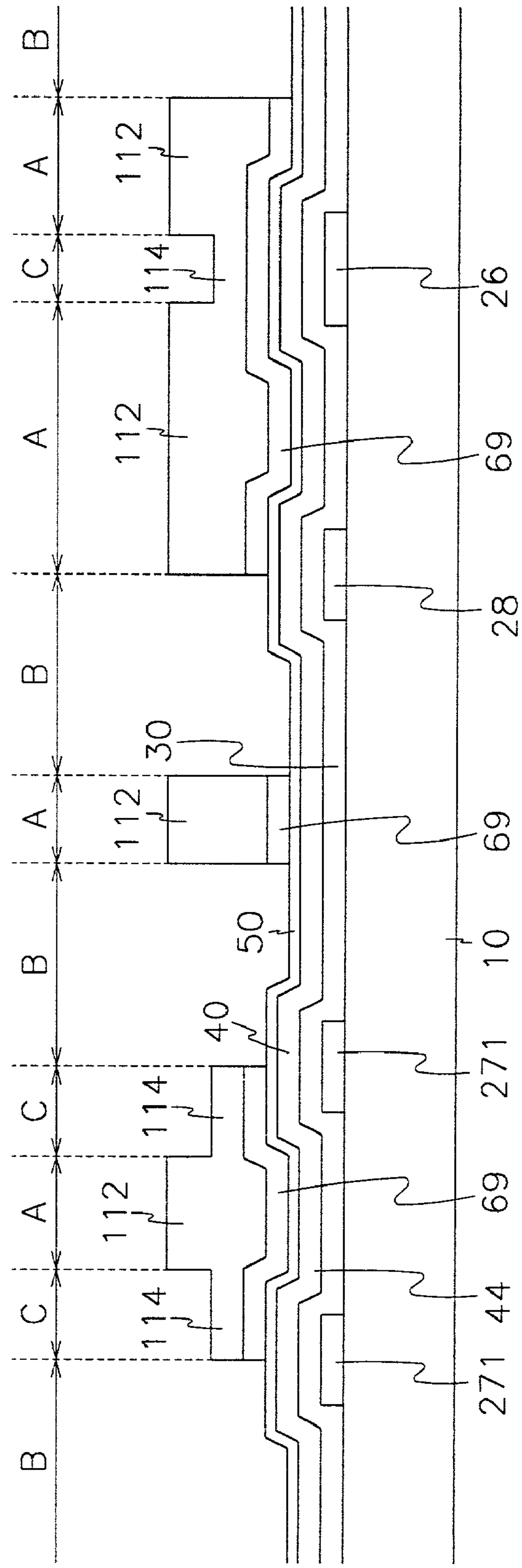

Specifically, as shown in FIG. 10, the conductive layer 60 at the B portion is removed while exposing the underlying ohmic contact layer 50 at this process, dry etching or wet etching is used in such a condition that the conductive layer 60 is etched, and the photoresist patterns 112 and 114 are not nearly etched. However, as the dry etching, is difficult to find such a selective etching condition, the photoresist patterns 112 and 114 may be etched together, provided that the thickness of the first photoresist pattern 114 is so large that the underlying conductive layer 60 is not exposed through the dry etching.

When the conductive layer 60 is formed with Mo or MoW alloy, Al or Al alloy, or Ta, either the dry etching or the wet etching may be applied. However, since Cr is not well removed through the dry etching, the wet etching is preferably applied to the Cr-based conductive layer 60. In the wet etching, $CeNHO_3$ may be used as the etching solution. In the dry etching, a mixture of $CF_4$ and HCl or $CF_4$ and $O_2$ may be used as the etching gas.

Consequently, as shown in FIG. 10, only the conductive pattern 69 at the portion A and the portion C is left, and the conductive layer 60 at the remaining portion B is all removed while exposing the underlying ohmic contact layer 50. The conductive pattern 69 has the same shape as the data line assembly 62, 65 and 66 except that the source and drain electrodes 65 and 66 are not separated from each other. Furthermore, in the case of dry etching, the photoresist patterns 112 and 114 are partially etched at some degree.

Thereafter, the exposed ohmic contact layer 50 at the B portion and the underlying semiconductor layer 40 are removed through dry etching together with the first photoresist pattern 114. The etching condition is that the photoresist patterns 112 and 114, the ohmic contact layer 50 and the semiconductor layer 40 are etched together (the semiconductor layer and the ohmic contact layer has almost the same etching selection property) while the gate insulating layer 30 being not etched. Particularly, it is preferable that the etching degrees with respect to the photoresist patterns 112 and 114 and the semiconductor layer 40 are nearly the same. For example, with the use of a mixture of $SF_6$ and HCL or a mixture of $SF_6$ and $O_2$, the two layers can be etched by nearly the same thickness. In case the etching degrees with respect to the photoresist patterns 112 and 114 and the semiconductor layer 40 are identical with each other, the thickness of the first photoresist pattern 114 is the same as or less than the sum in thickness of the semiconductor layer 40 and the ohmic contact layer 50.

Figure 11:
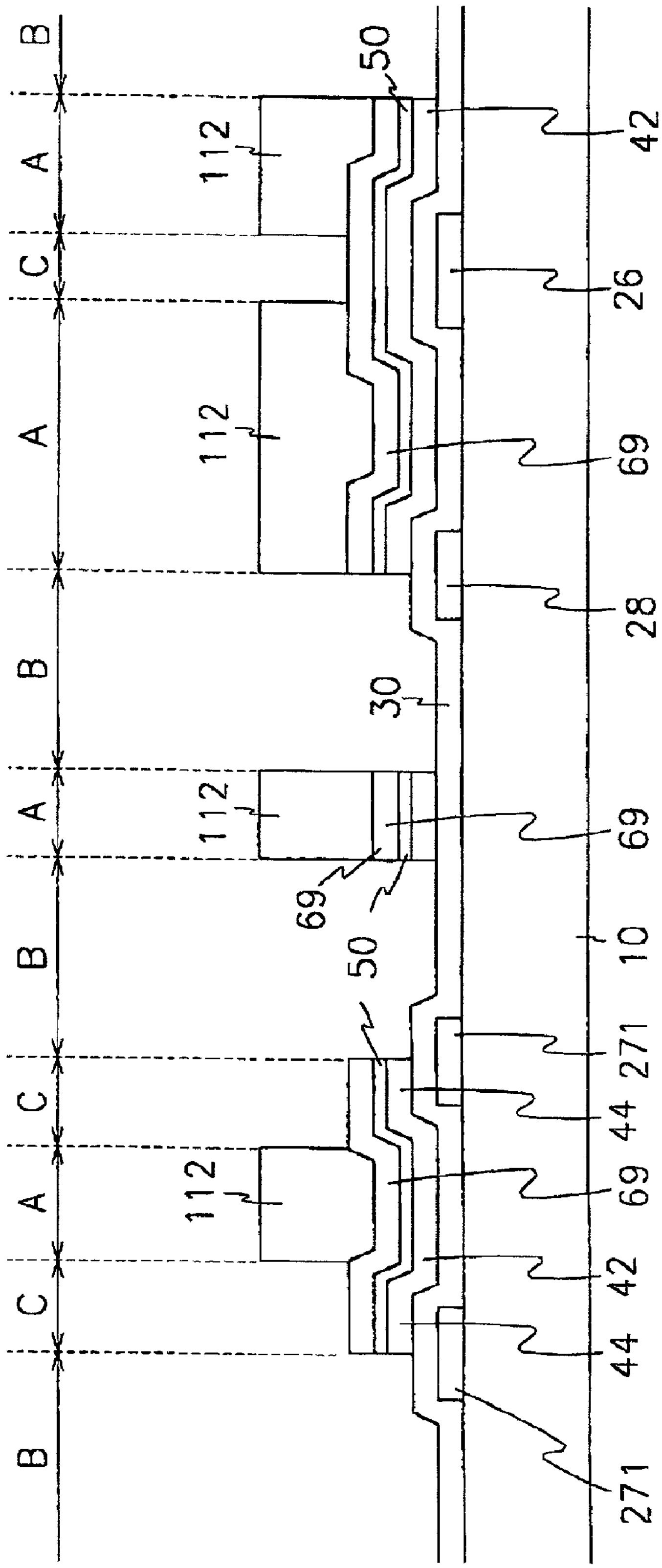

As shown in FIG. 11, the first photoresist pattern 114 at the C portion is removed while exposing the conductive pattern 69. And the ohmic contact layer 50 and the semiconductor layer 40 at the B portion are removed while exposing the gate insulating layer 30. Meanwhile, the second photoresist pattern 112 at the A portion is also etched and partially reduced in thickness. Furthermore, in this step, the semiconductor patterns 42 and the light interception patterns 44 are completed.

The photoresist residue at the C portion is removed through ashing. Plasma gas or microwave may be used for the ashing, and oxygen is the main content of the ashing composition.

Figure 12:
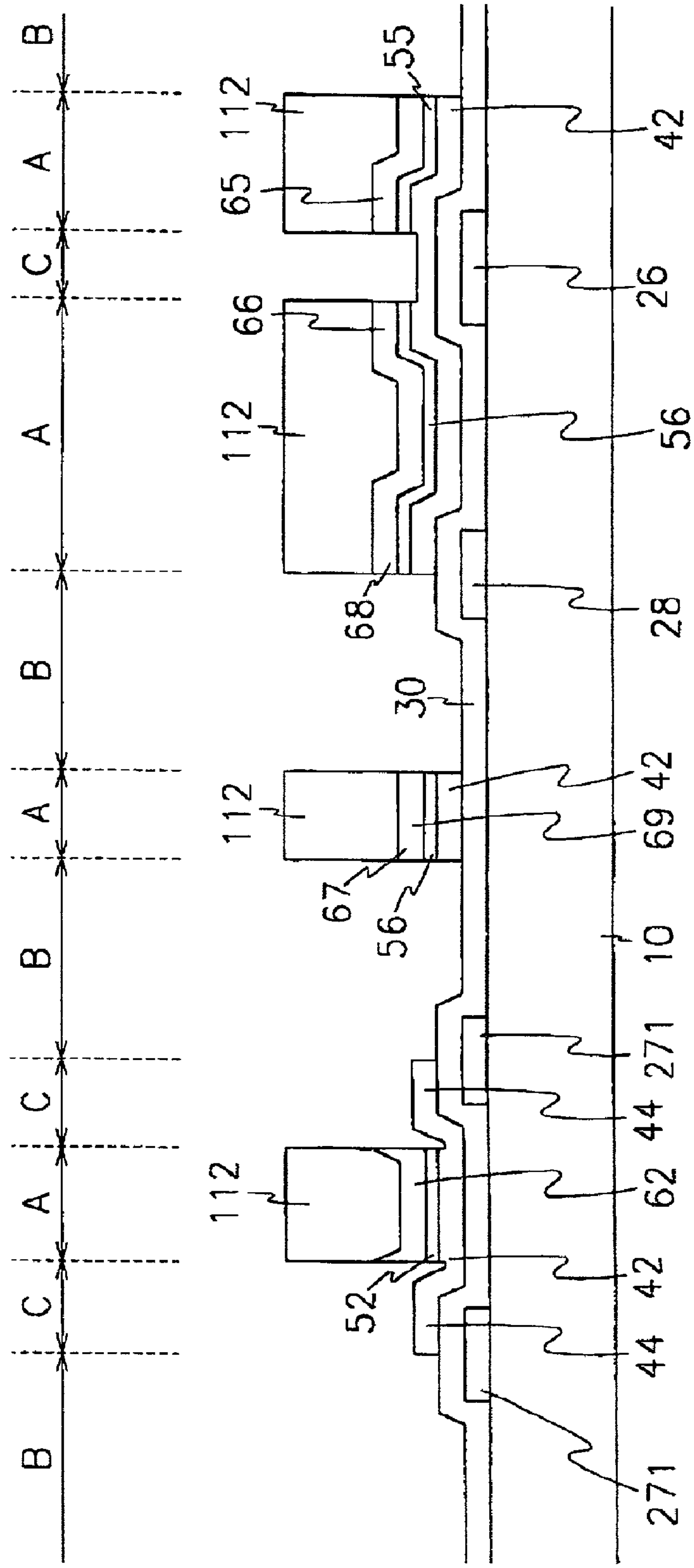

As shown in FIG. 12, the conductive pattern 69 at the C portion and the underlying ohmic contact pattern 50 are removed through etching. Dry etching may be applied to all of the conductive pattern 69 and the ohmic contact pattern 50. Alternatively, wet etching may be applied to the conductive pattern 69 while dry etching being applied to the ohmic contact pattern 50. In the former case, the etching is preferably performed under the condition that the etching selection ratios of the conductive pattern 69 and the ohmic contact pattern 50 are large. In case the etching selection ratios are not large, it is difficult to find the final point of etching and control the thickness of the semiconductor pattern 42 and the light interception pattern 44 to be left at the C portion. For instance, the conductive pattern 69 may be etched using the mixture of $SF_6$ and $O_2$. In the latter case where the wet etching and the dry etching are alternatively used, the lateral side of the conductive pattern 69 suffering the wet etching is etched, but that of the ohmic contact pattern 50 suffering the dry etching is not nearly etched so that stepped portions are made. A mixture of $CF_4$ and HCL or a mixture of $CF_4$ and $O_2$ may be used for the ohmic contact pattern 50, the semiconductor pattern 42, and the light interception pattern 44 as the etching gas. With the use of the mixture of $CF_4$ and $O_2$, the semiconductor pattern 42 and the light interception pattern 44 may be uniformly made. At this time, as shown in FIG. 7, the semiconductor pattern 42 and the light interception pattern 44 as well as the second photoresist pattern 112 may be reduced in thickness. The etching condition is that the gate insulating layer 30 is not etched. The thickness of the second photoresist pattern 112 should be large enough not to expose the underlying data line assembly 62, 65 and 66 through the etching.

Consequently, the source and drain electrodes 65 and 66 are separated from each other while completing the data line assembly 62, 65 and 66 and the underlying ohmic contact patterns 55 and 56.

Finally, the second photoresist pattern 112 at the A portion is removed. However, the second photoresist pattern 112 may be removed before removing the ohmic contact pattern 50 after the conductive pattern 69 at the C portion is removed.

Furthermore, when the data line assembly is formed with a material well adapted to the dry etching, the ohmic contact patterns, the semiconductor patterns and the data line assembly may be completed through performing only one etching process without establishing several intermediate processing steps. That is, in the etching process, when the metallic layer 60, the ohmic contact layer 50 and the semiconductor layer 40 at the B portion are etched, the first photoresist pattern 114 and the underlying ohmic contact layer 50 at the C portion are etched, and the second photoresist pattern 112 at the A portion is partially etched.

As described above, the wet etching and the dry etching may be alternatively used, or only the dry etching may be used. In the latter case, since only one kind of etching is used, the processing is relatively simple, but it is difficult to find proper etching conditions. By contrast, in the former case, it is relatively easy to find the proper etching conditions, but the processing steps are complicated compared to the latter case.

After the formation of the data line assembly 62, 65 and 66, as shown in FIG. 7, silicon nitride is deposited onto the substrate 10 through chemical vapor deposition, or organic insulating material is spin-coated onto the substrate 10 to thereby form a protective layer 70 with a thickness of 2000 Å or more.

In short, the semiconductor patterns 42 and the data line assembly 62, 65 and 66 may be formed through photolithography using on one mask, thereby simplifying the processing steps. At this time, the semiconductor patterns 42 and the light interception patterns 44 may be formed using the first photoresist pattern 114 with a relatively thin thickness.

Furthermore, the photoresist pattern with a relatively thin thickness is formed only at the channel portion for the TFT, and the light interception pattern connected to the semiconductor pattern is formed such that it is extended outward of the data line, thereby preventing light leakage at the periphery of the data line.

Figure 13:
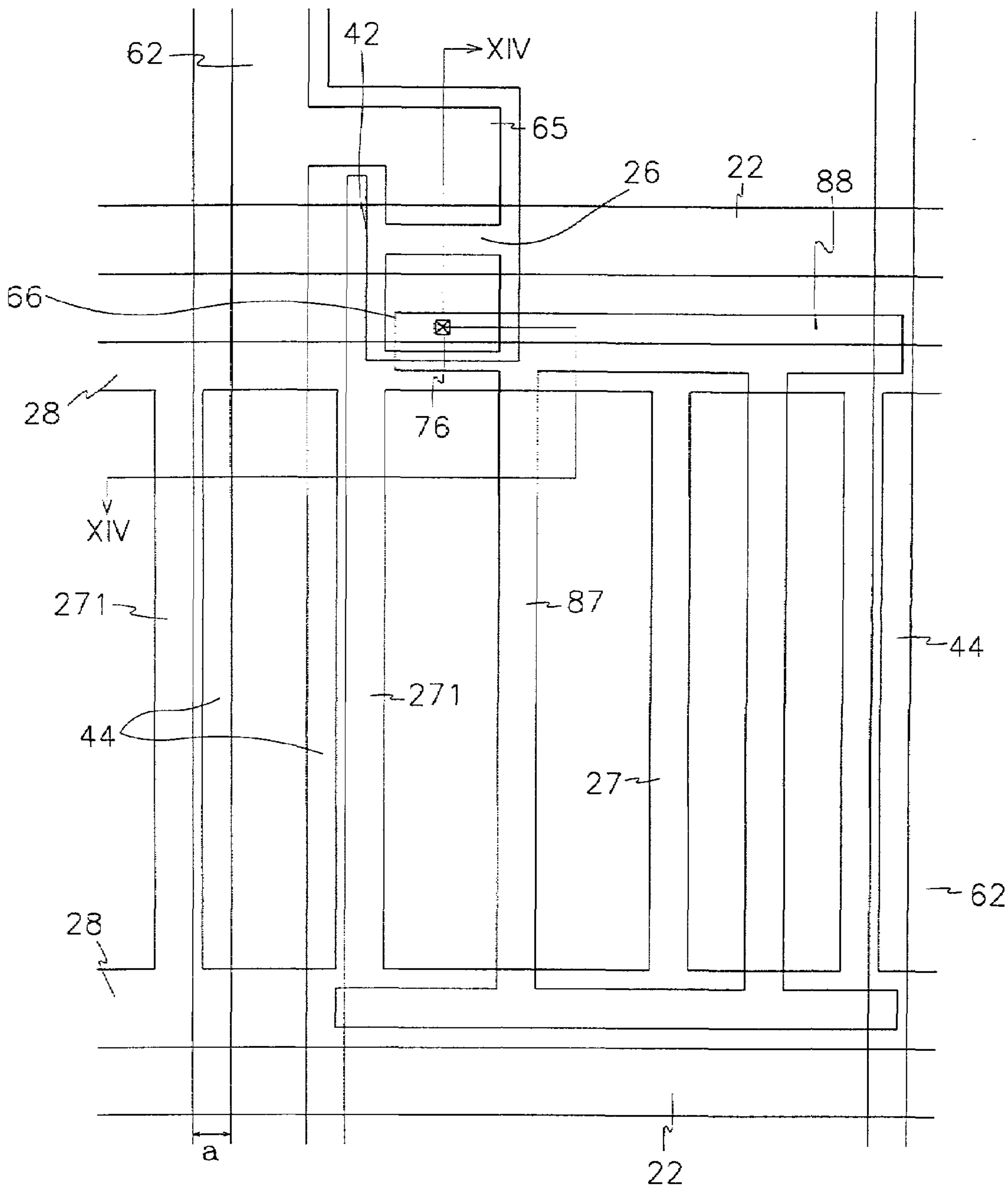
FIG. 13 is a plan view of a thin film transistor array substrate for an in-plane switching type liquid crystal display according to a third preferred embodiment of the present invention.
Figure 14:
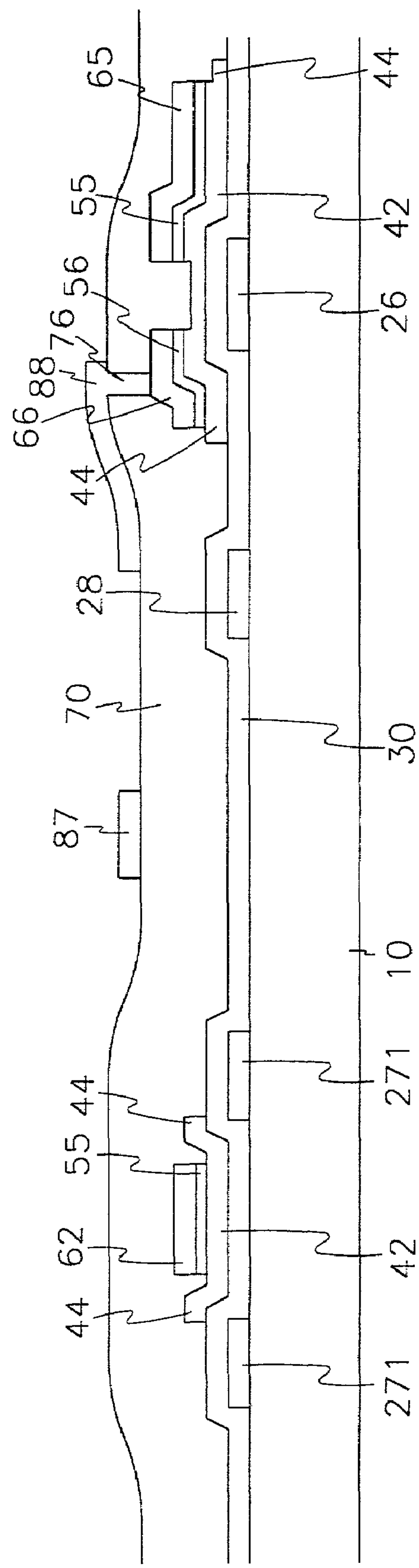
FIG. 14 is a cross sectional view of the thin film transistor array substrate taken along the XIV–XIV' line of FIG. 13.

FIG. 13 is a plan view of a thin film transistor array substrate for an in-plane switching type liquid crystal display according to a third preferred embodiment of the present invention, and FIG. 14 is a cross sectional view of the thin film transistor array substrate taken along the XIV–XIV' line of FIG. 13.

As shown in the drawings, the overall structure of the thin film transistor array substrate is quite similar to the second preferred embodiment.

The difference is that light interception patterns 44 are connected to the semiconductor patterns 42, and extended external to the data line assembly 62, 65 and 66 by the width of a. Furthermore, a pixel line assembly 88 and 87 is formed on a protective layer 70 with contact holes 76, and connected to the drain electrodes 66 through the contact holes 76 of the protective layer 70.

The method of fabricating the thin film transistor array substrate shown in FIG. 13 will be now described with reference to FIGS. 15 to 19B.

Figure 15:
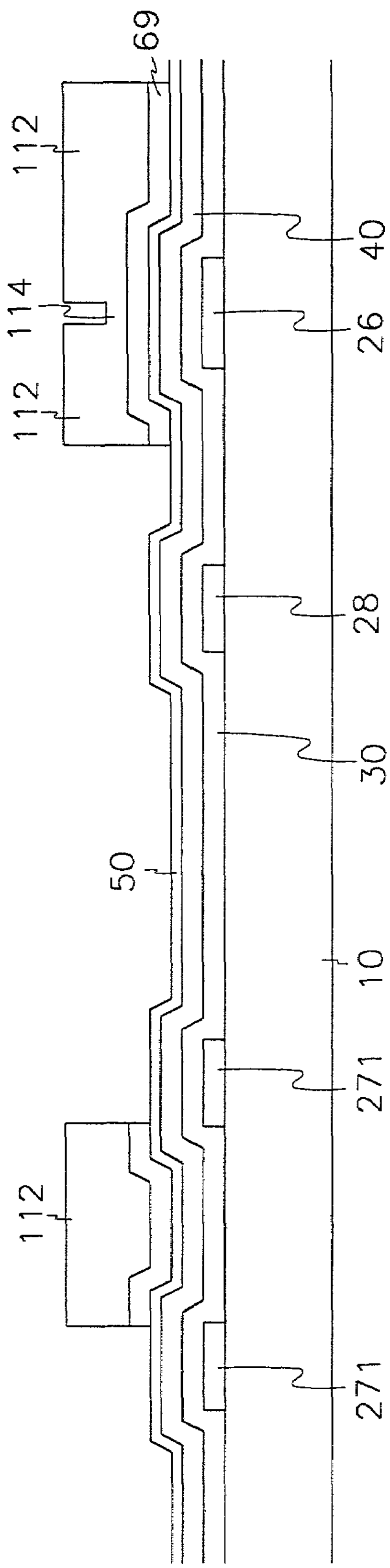
FIGS. 15 to 17 sequentially illustrate the steps of fabricating the thin film transistor array substrate shown in FIG. 13 after the processing step illustrated in FIGS. 3A and 3B.

First, as shown in FIG. 15, first and second photoresist patterns 114 and 112 are made in the same way as in the second preferred embodiment, and the conductive layer 60 is etched using the first and second photoresist patterns 114 and 112 as the etching mask to thereby form a conductive pattern 69.

Figure 16:
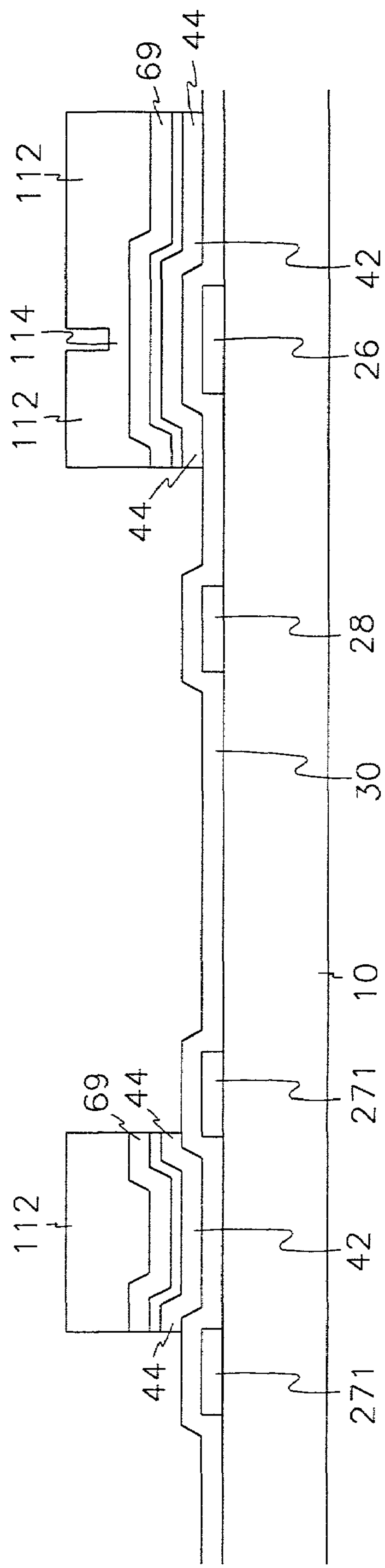

Thereafter, as shown in FIG. 16, the exposed ohmic contact layer 50 and the underlying semiconductor layer 40 are removed through dry etching while exposing the gate insulating layer 30 and the conductive pattern 69 at the channel portion. At this time, the light interception patterns 44 and the semiconductor patterns 42 are completed.

Figure 17:
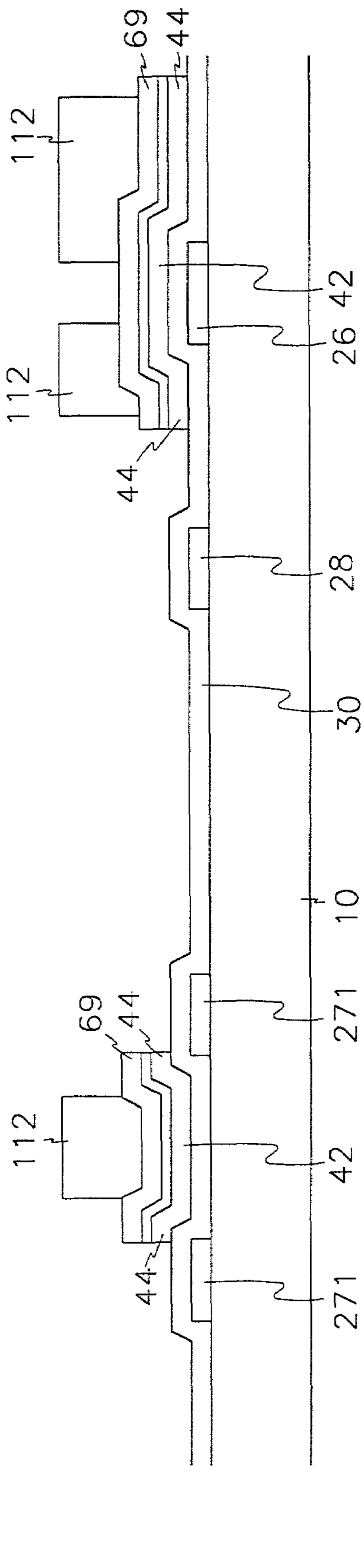

As shown in FIG. 17, the first photoresist pattern 114 at the channel portion is entirely removed through etch back to expose the conductive pattern 69. At this time, the second photoresist pattern 112 is partially removed while being reduced in width and thickness and exposing the periphery of the conductive pattern 69.

Figure 18A:
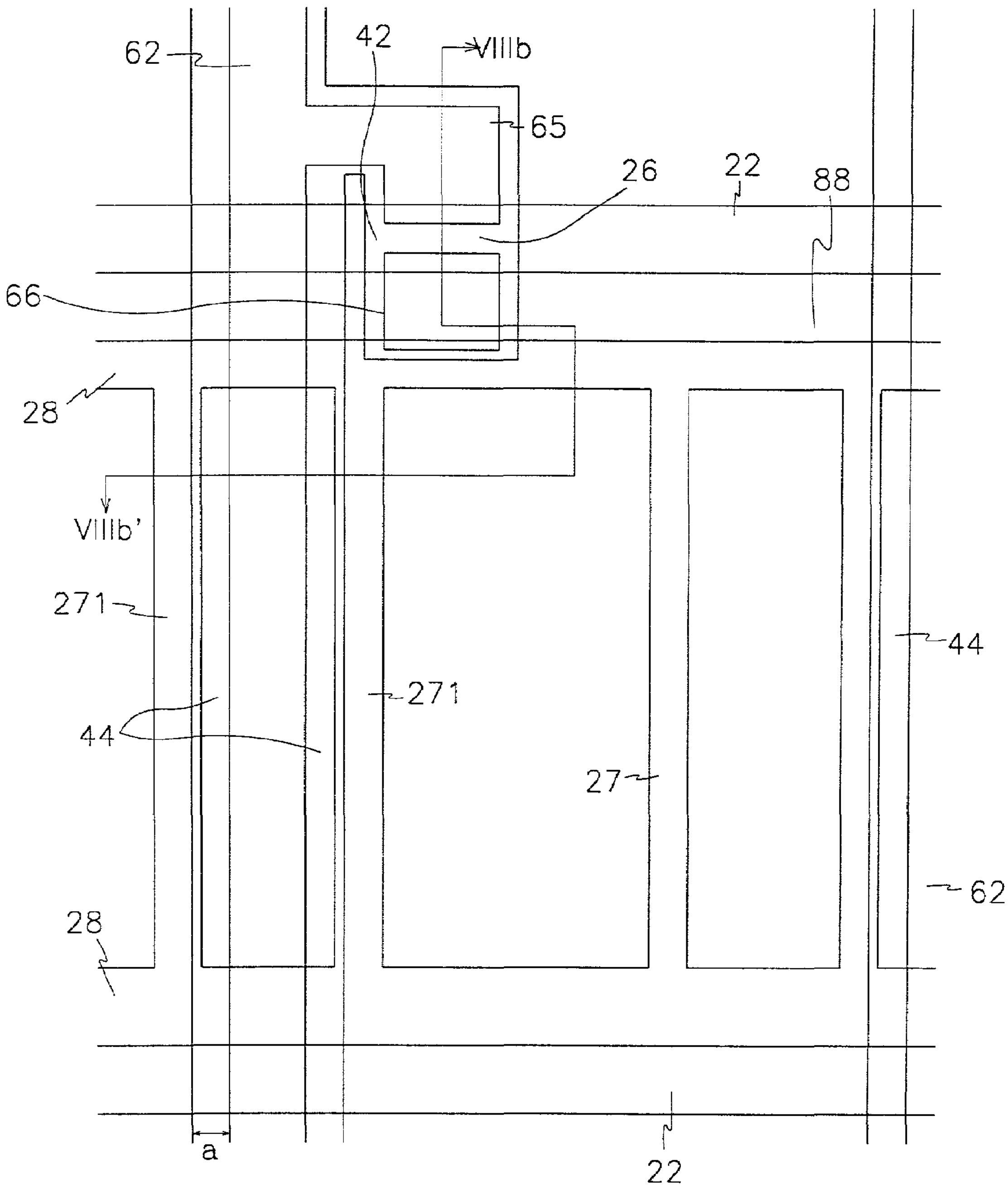
FIGS. 18A and 19A are plan views sequentially illustrating the steps of fabricating the thin film transistor array substrate shown in FIG. 13 after the processing steps illustrated in FIG. 17.
Figure 18B:
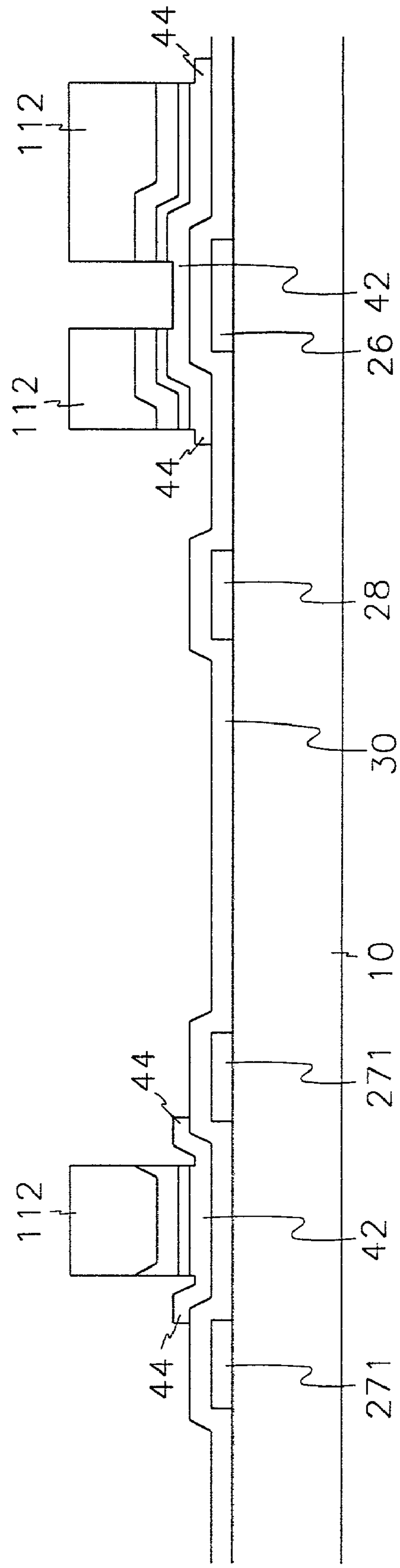
FIGS. 18B and 19B are cross sectional views of the thin film transistor array substrate taken along the XVIIIb–XVIIIb' line of FIG. 18A, and the XIXb–XIXb' line of FIG. 19A, respectively.

Thereafter, as shown in FIGS. 18A and 18B, the exposed conductive pattern 69 and the underlying ohmic contact layer 50 are etched using the second photoresist pattern 112 as the etching mask. Consequently, the source and drain electrodes 65 and 66 are separated from each other, thereby completing the data line assembly 62, 65 and 66 and the underlying ohmic contact patterns 55 and 56. The width of the light interception pattern 44 extended external to the data line assembly is preferably in the range of 1–3.

Figure 19A:
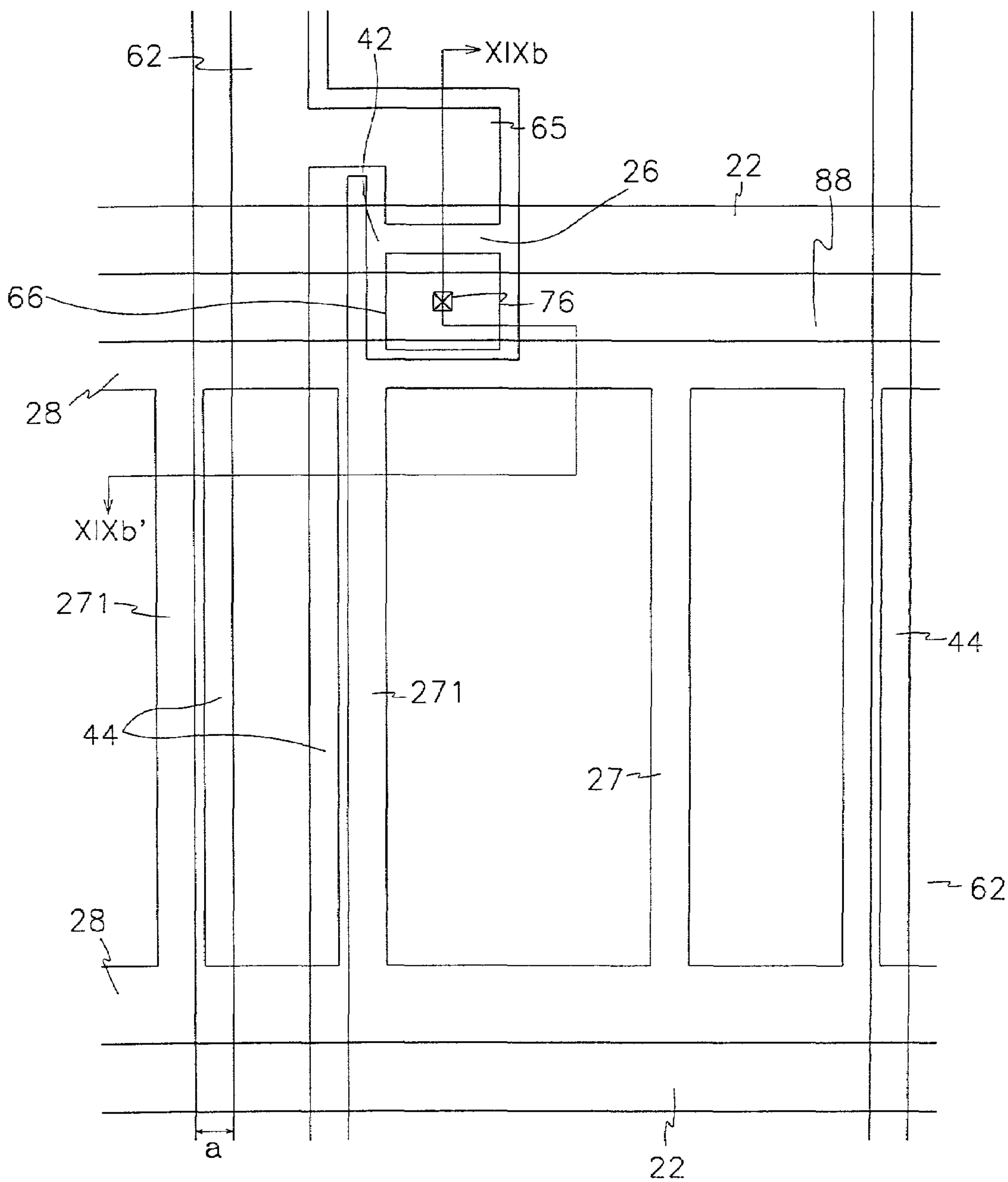
Figure 19B:
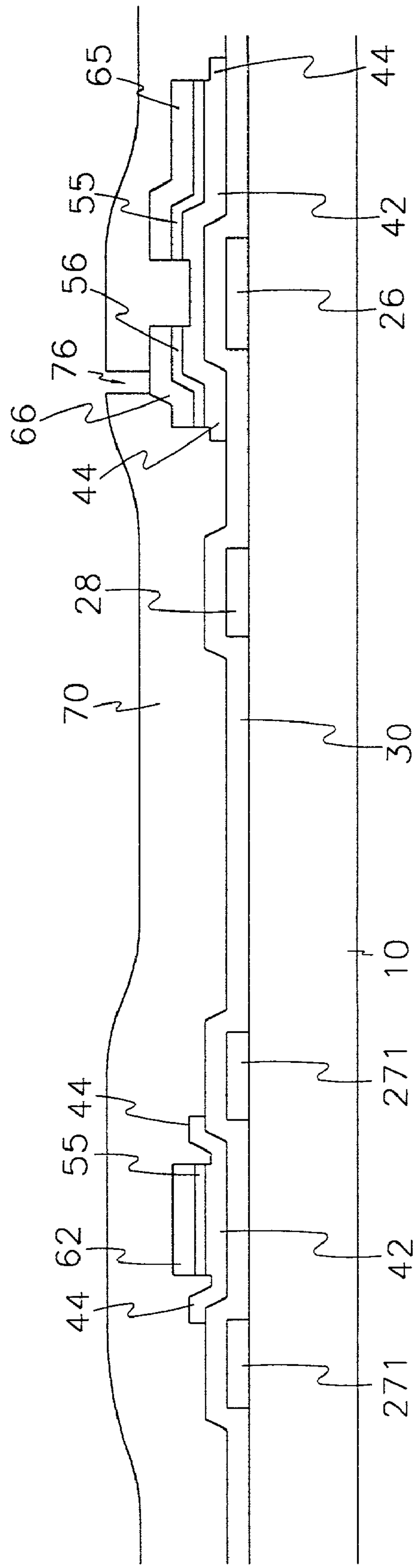

After the data line assembly 62, 65 and 66 is completed and the second photoresist pattern 112 is removed, as shown in FIGS. 19A and 19B, silicon nitride is deposited onto the substrate 10 through chemical vapor deposition, or organic insulating material is spin-coated onto the substrate 10 to thereby form a protective layer 70 with a thickness of 2000 Å or more. The protective layer 70 is patterned through photolithography to thereby form contact holes 76 exposing the drain electrodes 66.

Finally, a conductive layer is deposited onto the protective layer 70, and patterned to thereby form a pixel line assembly 88 and 87 connected to the drain electrodes 66 through the contact holes 76.

A subsidiary data line assembly and subsidiary pads may be additionally formed at the same plane as the pixel line assembly 88 and 87 such that they are electrically connected to the data lines 62 through the contact holes 76 of the protective layer 70.

As described above, the light interception patterns are formed at the same plane as the semiconductor patterns so that possible leakage of light at the periphery of the data lines is prevented while blocking occurrence of lateral cross talk.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A liquid crystal display (LCD), comprising:
- a plurality of gate lines formed on a substrate;
- a plurality of data lines insulated from and crossing over the plurality of gate lines;
- a plurality of pixel regions defined by the crossing of the plurality of gate lines and the plurality of data lines;
- a semiconductor layer comprising a semiconductor pattern and a light interception pattern disposed on a single plane;
- a common electrode formed in each pixel region on the substrate;
- a pixel electrode formed in each pixel region, spaced apart from the common electrode with a predetermined distance therebetween; and
- a thin film transistor provided to each pixel region and including the semiconductor pattern.

2. The LCD of claim 1, wherein the light interception pattern and the data line corresponding thereto overlap each other, and the light interception pattern and the common electrode or the pixel electrode close to the data line corresponding thereto overlap each other.

3. The LCD of claim 1, wherein the light interception pattern and the common electrode or the pixel electrode of a neighboring pixel region overlap each other.

4. The LCD of claim 1, wherein the semiconductor pattern is connected to the light interception pattern corresponding thereto.

5. The LCD of claim 1, wherein the semiconductor pattern is extended to the data line corresponding thereto.

6. The LCD of claim 1, wherein the light interception pattern is extended beyond a periphery of the data line corresponding thereto.

7. The LCD of claim 1, wherein the common electrode is formed on the same plane as the plurality of gate lines.

8. The LCD of claim 1, wherein the pixel electrode is formed on the same plane as the plurality of data lines.

9. The LCD of claim 1, wherein the pixel electrode is formed on the plane different from the plurality of data lines.

10. A liquid crystal display (LCD), comprising:
- an insulating substrate;
- a gate line assembly formed on the substrate and comprising a plurality of gate lines, and a plurality of gate electrodes connected to the gate lines;
- a common electrode formed on the substrate and separated from the gate line assembly;

a gate insulating layer covering the gate line assembly and the common electrode;

a semiconductor pattern formed on the gate insulating layer over the gate electrodes;

a light interception pattern formed on the gate insulating layer and formed of the same material as the semiconductor pattern;

a data line assembly comprising:

a source electrode and a drain electrode formed on the semiconductor pattern, and a plurality of data lines connected to the source electrode and crossing over the plurality of gate lines to define a pixel region; and a pixel electrode formed in the pixel region and alternatively located side by side with the common electrode, wherein the pixel electrode is coupled to the drain electrode.

11. The LCD of claim 10, wherein the light interception pattern and the data line corresponding thereto overlap each other, and the light interception pattern and the common electrode or the pixel electrode close to the data line corresponding thereto overlap each other.

12. The LCD of claim 10, wherein the light interception pattern and the common electrode or the pixel electrode of a neighboring pixel region overlap each other.

13. The LCD of claim 10, wherein the semiconductor pattern is connected to the light interception pattern corresponding thereto.

14. The LCD of claim 13, wherein the semiconductor pattern is extended to the data line corresponding thereto.

15. The LCD of claim 14, wherein the light interception pattern is extended beyond a periphery of the data line corresponding thereto.

16. The LCD of claim 14, wherein the semiconductor pattern has the same shape as the data line except for a channel portion between the source electrode and the drain electrode.

17. The LCD of claim 10, wherein the pixel electrode is formed on the same plane as the plurality of data lines.

18. The LCD of claim 17, wherein the semiconductor pattern is extended to the pixel electrode.

19. The LCD of claim 10, further comprising a protective layer covering the data line assembly and having a contact hole, wherein the pixel electrode is formed on the protective layer and connected to the drain electrode through the contact hole.

20. The LCD of claim 10, further comprising an ohmic contact pattern interposed between the semiconductor pattern and the data line assembly.

21. The LCD of claim 20, wherein the ohmic contact pattern has the same shape as the plurality of data lines.

22. A method for fabricating a liquid crystal display (LCD), comprising steps of:

forming a gate line assembly and a common line assembly on an insulating substrate, the gate line assembly comprising gate lines and gate electrodes, and the common line assembly comprising common electrodes;

forming a gate insulating layer on the substrate covering the gate line assembly and the common line assembly;

forming a semiconductor pattern and a light interception pattern, both formed of the same material, on the gate insulating layer;

forming a data line assembly on the gate insulating layer, the data line assembly comprising a source electrode and drain electrode, and a plurality of data lines; and forming a pixel electrode.

23. The method of claim 22, wherein the data line assembly is formed on the same plane as the pixel electrodes.

24. The method of claim 23, wherein the light interception pattern, the semiconductor pattern, the data line assembly and the pixel electrode are patterned by photoresist patterns.

25. The method of claim 24, wherein the photoresist patterns comprise:

a first pattern with a predetermined thickness placed at a channel portion between the source and the drain electrodes as well as at the light interception pattern, a second pattern having a thickness larger than the thickness of the first pattern, and a third pattern having a thickness smaller than the thickness of the first pattern.

26. The method of claim 25, wherein the photoresist patterns are formed by a single mask.

27. The method of claim 26, wherein the steps of forming the semiconductor pattern, the light interception pattern, the data line assembly and the pixel electrode, comprise steps of:

sequentially depositing a semiconductor layer and a conductive layer on the gate insulating layer;

coating a photoresist film onto the conductive layer;

exposing the photoresist film to light through the mask;

developing the photoresist film to form the photoresist patterns, the second photoresist pattern being placed over the data line assembly;

etching the conductive layer under the third photoresist pattern and the underlying semiconductor layer to form the semiconductor pattern and the light interception pattern;

removing the first photoresist pattern through ashing;

etching the conductive layer the second photoresist pattern as mask to complete the data line assembly and the pixel electrodes; and removing the remaining photoresist pattern.

28. The method of claim 27, wherein the semiconductor pattern has the same shape as the data line assembly except for the channel portion between the source electrode and the drain electrode.

29. The method of claim 28, wherein the light interception pattern, the semiconductor pattern and the data line assembly are formed by a photoresist pattern.

30. The method of claim 29, wherein the photoresist pattern comprises:

a first pattern with a predetermined thickness placed at the channel portion between the source electrode and the drain electrode;

a second pattern having a thickness larger than the thickness of the first pattern; and a third pattern having a thickness smaller than the thickness of the first pattern.

31. The method of claim 30, wherein the photoresist pattern is formed by a single mask.

32. The method of claim 31, wherein the step of forming the semiconductor pattern, the light interception pattern, and the data line assembly further comprises steps of:

sequentially depositing a semiconductor layer and a conductive layer on the gate insulating layer;

coating a photoresist film onto the conductive layer;

exposing the photoresist film to light through the mask;

developing the photoresist film to photoresist patterns, the second photoresist pattern being placed over the data line assembly;

etching the conductive layer under the third photoresist pattern and the underlying semiconductor layer to form the semiconductor patterns and the light interception patterns;

removing the first photoresist pattern through etch back, and etching the second photoresist pattern;

etching the conductive layer using the second photoresist pattern as mask to complete the data line assembly; and removing the remaining photoresist pattern.

33. The method of claim 32, wherein the pixel electrode and the data line assembly are formed on different planes.

34. The method of claim 33, further comprising steps of:

forming a protective layer after forming the data line assembly to cover the data line assembly; and forming the pixel electrodes on the protective layer.

35. A liquid crystal display (LCD), comprising:

a gate line formed on a substrate;

a data line insulated from and intersecting the gate line;

a semiconductor layer comprising a semiconductor pattern and a light interception pattern disposed on a single plane;

a thin film transistor connected to the gate line and the data line, the thin film transistor including the semiconductor pattern; and a field-generating electrode having a portion laterally spaced apart from the data line with a gap therebetween, wherein the light interception pattern overlaps the gap.

36. The LCD of claim 35, wherein the light interception pattern and the data line overlap each other, and the light interception pattern and the field-generating electrode overlap each other.

37. The LCD of claim 35, wherein the semiconductor layer is connected to the light interception pattern.

38. The LCD of claim 35, wherein the light interception pattern is wider than the data line.

* * * * *